July 14, 1970

C. J. SHAW 3,520,003

TOILET UNIT

Filed Jan. 5, 1968

INVENTOR.
CHARLES J. SHAW
BY Westell & Hanley

July 14, 1970

C. J. SHAW 3,520,003

TOILET UNIT

Filed Jan. 5, 1968

INVENTOR.
CHARLES J. SHAW

BY Westell & Hanley

United States Patent Office 3,520,003
Patented July 14, 1970

3,520,003
TOILET UNIT
Charles J. Shaw, 20 Bridesburg Drive,
Weston, Ontario, Canada
Filed Jan. 5, 1968, Ser. No. 696,021
Int. Cl. E03d 11/00, 11/11
U.S. Cl. 4—77                                    9 Claims

ABSTRACT OF THE DISCLOSURE

A self-contained toilet chemically and physically treats the effluent from the toilet bowl and holds the treated effluent in a tank where, on a control actuation it is pumped into the bowl as the flushing liquid. Preferably the pump motor is used to drive the physical treatment means so that physical treatment and flushing takes place simultaneously.

---

This invention relates to a toilet unit.

The toilet unit is designed to be self-contained and to flush without a separate water supply. The effluent from the toilet is used to provide the flush liquid and may be stored over an extended period before evacuation is necessary. The toilet is particularly suited for marine use but is also suited for portable and many other land uses.

In the preferred form of the invention, the unit provides a screened enclosure arranged to receive the effluent from the toilet, and to retain therein any portions of the effluent larger than the screen aperture. The enclosure is located within the walls of a tank. The apertures in the screened enclosure define the maximum size of the particles which may escape from the enclosure into the tank outside the enclosure. With preferred agitation methods inside the enclosure, however, the average size of particles escaping is much less than the screen size, since the travel in the enclosure is caused to be, to a large extent, non-normal to the screen. A withdrawal conduit is located with its open lower end opening into the tank at a location spaced from the screened enclosure. The tank is filled, to a level above the open end, with a chemical compound sutiable to reduce, to acceptable minimal proportions the germ content (usually determined by the "coli count"); and to substantially eliminate the odour and the disagreeable appearance, (color etc.) of the effluent. The spacing of the withdrawal conduit end from the screen is chosen in relation to the strength of the chemical solutions, that for the flow patterns and rates, the above chemical results are achieved during travel of the effluent from the screened enclosure to the withdrawal conduit. (The chemical solution is usually combined with a deodorant, a perfume and a dye.) A pump is connected to the upper end of the withdrawal conduit, and the pump output is connected to the flush outlet of the toilet bowl. Means are provided for agitating the effluent in the screened container, and the agitating means and pump are preferably turned on and off simultaneously at the time the toilet is flushed and when flushing ceases, respectively. The result is that when the toilet is flushed the pump provides flush liquid from the treated effluent which is odorless and of sufficiently low bacteria content to meet health requirements. At the same time the effluent in the screened enclosure is agitated and eventually goes through the screen into the tank in pulverized form. It will be noted that since the agitation takes place at the same time as the flushing action, the chemical treatment of fresh effluent is commenced as soon as it arrives in the enclosure.

The toilet unit, in accord with the invention, is thus self-contained, requiring no separate water supply or tank for flushing, is designed to operate efficiently, and is adapted for compact design. Within such design the mechanical and chemical treatment is such that the effluent stored in the tank may be retained through an extended period of use of the toilet without providing a disagreeable odor or health problem. On the other hand, the mechanical and chemical treatment is such that (where sanitary and conservation laws permit) the effluent in the tank may be discharged on land or in the water, without creating the health hazards or pollution associated with untreated sewage.

In a preferred form of the invention, the flow connection from the pump to the flush outlet is provided with a valve operable, when desired, to disconnect the pump outlet from the flush outlet and to divert the pump outlet to a discharge connection extending exteriorly of the unit. This allows alternative flushing or tank evacuation in combination with the pulverization of the effluent from a single source and with a compact design.

In a preferred form of the invention, the screened enclosure takes the form of a surface of revolution and the agitation means comprises a shaft driven by a motor with the shaft coaxial with the axis of the surface of revolution and with blade designed to apply a motion to the effluent having a component along the shaft axis. The result is that substantially all of the effluent is forced to attempt to pass through the screen in a non-normal direction so that the particle size in escaping effluent is even smaller than the screen apertures, hastening in the tank, the chemical treatment, deodorization and change of appearance of the effluent.

The preferred arrangement of the blades discussed in the previous paragraph, is where blades adjacently disposed along said shaft are pitched to drive, during rotation of the shaft, the effluent in opposite axial directions. This produces the greatest turbulence and agitation, and the highest components of opposing axial flow.

In a preferred embodiment of the general form of the invention discussed in paragraph 3 of the application, the screened enclosure is located adjacent one wall of the tank. This has a dual advantage: firstly, that the pulverization is improved by the hydrodynamic effect on the agitated effluent of a non-yielding surface adjacent the agitation source and, secondly, that the location of such screened enclosure adjacent one end of the tank, allows it to be spaced from the withdrawal conduit more than half the major horizontal dimension of the tank. This provides a favourably long travel distance for the effluent between its exit from the screen and its ingress into the withdrawal conduit in which chemical action and treatment may take place.

In a preferred embodiment of the general form of the invention discussed in paragraph 3 of the application, the pump and agitating means are driven by the same motor and are connected so that they are simultaneously operated or nonoperated and hence agitation takes place simultaneously with flushing.

In a preferred form of the development, as discussed in the previous paragraph, the power output shaft of such motor extends from each end thereof, and said motor pump and impeller shaft are so arranged that one shaft extension is directly connected to said pump and the other shaft extension is connected to the impeller shaft carrying blades as discussed previously.

In drawings which illustrate a preferred embodiment of the invention:

Figure 1:
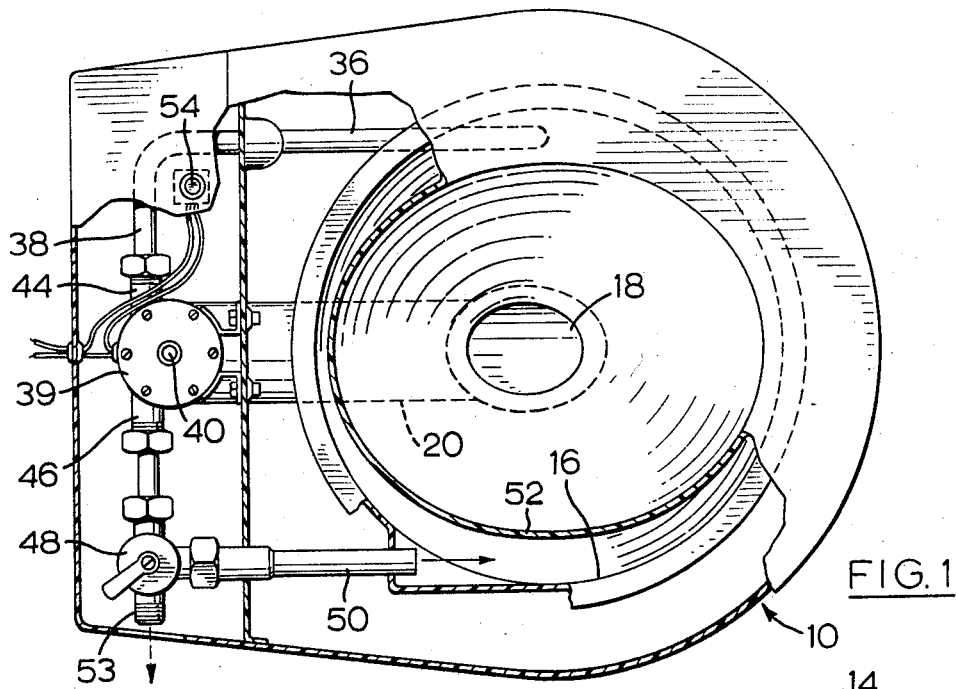
FIG. 1 is a top view (partially cut away) of a toilet unit in accord with the invention.
Figure 2:
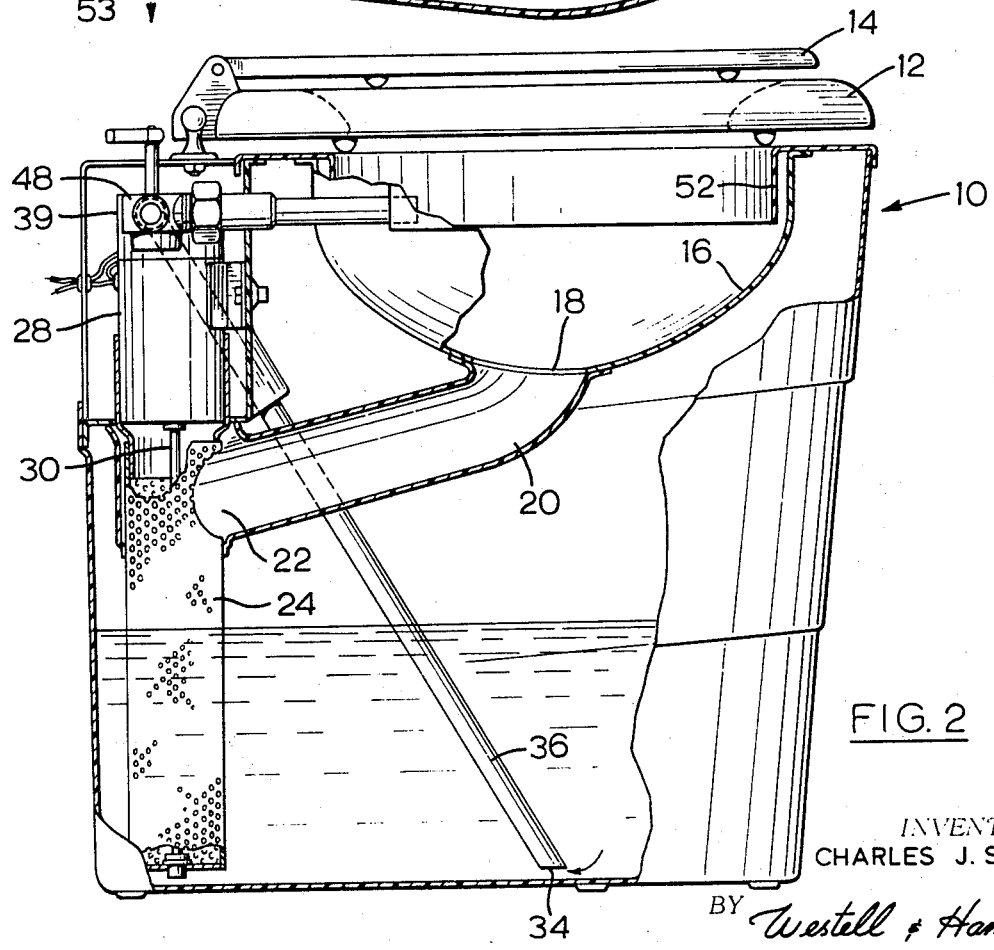
FIG. 2 is a side view (partially cut away) of the toilet unit in accord with the invention.

In the drawings is shown a tank 10 having pivotally mounted thereon a seat 12 (not shown in FIG. 1) and there is pivotally mounted to swing thereover a seat cover 14.

The tank 10 is provided with a wall 16 defining a toilet bowl and which divides the tank into a central upper section and a lower tank section. Wall 16 tapers downwardly to form an outlet opening 18 which is the inlet of the toilet effluent conduit 20. The toilet effluent conduit 20 (preferably without the normal trap which is not considered necessary with this construction) extends downwardly and to a position rearward of the bowl to a lower outlet opening 22 lower than its inlet 18 and forming the inlet to a screened enclosure 24 extending downwardly into the tank. The screened enclosure 24 is designed in accord with the invention and its purposes, to receive through conduit 20 all the effluent from the toilet bowl, so that only effluent which has passed through the screen aperture escapes into that part of the tank outside the enclosure which is beneath the bowl. (This part of the tank is called the main tank chamber hereafter.) The screened enclosure is located adjacent one of the side walls of the enclosure and preferably adjacent the wall facing the longer horizontal dimension of the tank.

Since the screened enclosure receives all the effluent from the bowl, the effluent escaping to the main tank chamber must be at least as small as the screen apertures. Agitation means are provided in the screened enclosure for breaking up the solid material, both natural and foreign, in the effluent. By causing such agitated travel to be largely non-normal to the screen walls of the enclosure it is assured that the average size of solid passing through the screen must be considerably smaller than the screen apertures.

In its preferred form, the screened enclosure forms a surface of revolution (here a cylinder) with its axis extending approximately vertically and with the axis located rearwardly of the bowl and approximately centrally between the sides of the toilet. Mounted on the tank is a motor 28 positioned to have one end of its output shaft 30 extending downwardly into the screened enclosure and to be coaxial with the axis of revolution of the enclosure shape. The motor shaft 30 forms the blade shaft for the effluent agitation means. The agitation means comprise a plurality of pairs of pitched blades 32 axially disposed along the shaft 30. These pairs of blades are arranged so that adjacent pairs drive the effluent in opposite axial directions so that the effluent is violently agitated and so that the tendency of flow (augmented by the rotary motion of the blades, is non-normal to the side walls of the screened enclosure). The flow, due to blade rotation, is non-normal to the bottom wall of the enclosure also but this is preferably solid rather than screened. The breaking up of the solid effluent through such agitation is increased by the proximity of the adjacent tank wall, which, acting as an unyielding surface adjacent the agitator, acts to increase the effect of the pressure waves created by the agitator on the solid effluent.

For ease of mounting of the blades, pairs of upwardly driving blades 32U are mounted at the same shaft location with pairs of downwardly driving blades 32D.

Figure 3:
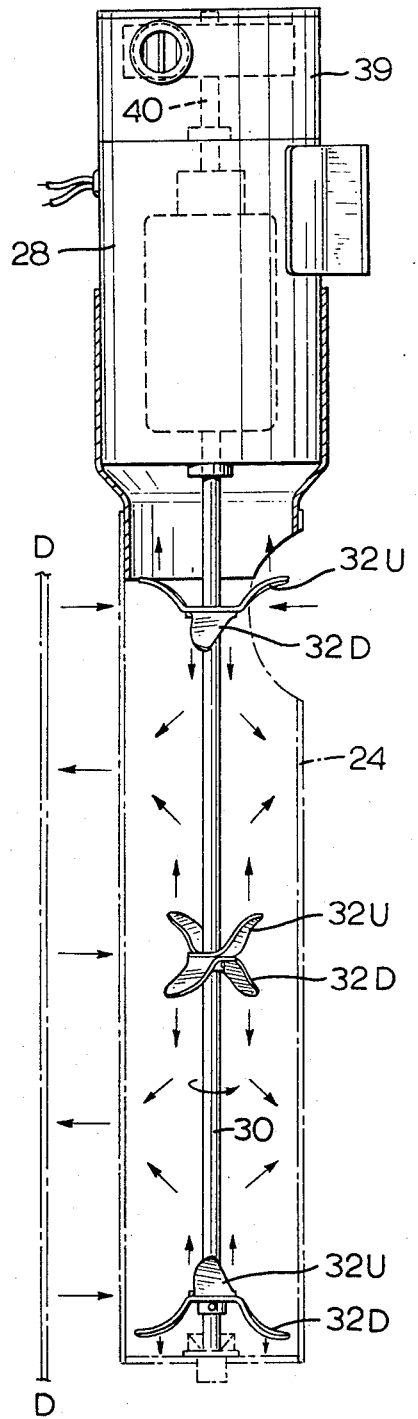
FIG. 3 is a view of the preferred form of the pump, motor and agitator.

The flow directions are indicated in FIG. 3 where the location of the tank rear wall (the adjacent wall to the agitator) is shown by dotted lines D—D.

The main tank chamber is preferably designed to be longer from front to rear than from side to side and at a location spaced from the screened enclosure by a distance longer than half the major horizontal dimension of the tank, is the inlet opening 34 of a withdrawal conduit 36. The opening 34 is located closely (preferably about ¼ inch) to the bottom of the tank and represents the depth to which the tank may be easily evacuated. (The tank may, when desired, be effectively cleaned of effluent by pumping it out to the level of opening 34 and then several times filling with fresh water followed each time by the pumping out of the tank.)

The withdrawal pipe 36 is located along one side of the tank (it is shown on the left side facing forwardly) and extends rearwardly and upwardly to an upper end 38 of the same rearward disposition as the motor. A self-priming pump 39, preferably of the centrifugal type, is mounted and disposed to have its impeller shaft formed of an upper extent 40 of the power output shaft of motor 28. The pump 39 is thus located rearwardly of the bowl 16 and the pump inlet is preferably laterally and horizontally aligned with the upper end 38 of the withdrawal conduit, to which it is connected by conduit 44. The outlet conduit 46 from pump 39 extends on the opposite side from conduit 44 to a valve 48 located near the right side (looking forwardly) of the toilet. In its normal setting, the valve 48 is positioned to direct flow to conduit 50 extending forwardly into the bowl to direct the output of conduit 50 horizontally and forwardly along one side thereof near the top. The bowl is provided at the top with an inwardly extending ledge and at the inner extremity of the ledge is provided a downwardly extending flange 52 to just below the height of the lowermost portion of conduit 50, which latter is designed to provide a horizontally directed stream of water. The flange 52 defines, with the ledge and the bowl wall, a downwardly opening groove which receives the output from conduit 50 and directs it about the bowl. A flushing stream is therefore provided with the force provided by pump 39 which creates a spiral flow downwardly about the bowl 16, to clean it.

The valve 48 is provided with an alternate position and, in the alternate position, shuts off flow to the flushing conduit and directs it to conduit stub 52 which has a nipple or threading, as shown, for connection to one end of an exhaust conduit, not shown, the other end of which will be directed to a desired evacuation location.

On a body of water, the evacuation location may be the body of water itself (if allowed by the governing laws) and bearing in mind the chemical treatment in the tank to be discussed hereafter.

The motor is turned on or off by depression and release, respectively of the button 54. In view of the direct connection of the motor 28 to the agitator and to the pump impeller, it will be seen that the agitation of the effluent and the pumping of the flush water take place simultaneously.

It will be seen that the provision of the double ended motor shaft allows the pump to be located directly over the impeller with the motor between them and contributes greatly to compactness of design which is very necessary with marine and other installations.

Initially the tank is provided with a sufficient chemical solution to kill the harmful bacteria in the toilet effluent. The presence of harmful bacteria is usually measured by the "coli count" and the lack of danger of the effluent for flushing or for evacuation will usually be determined in terms of having a "coli count" below a certain value. This should be of sufficient concentration to lower the "coli count" (or to kill the bacteria by any other accepted standard) during the travel of the effluent from the screened enclosure 24 to the inlet 34 of the withdrawal conduit 36. It will thus be seen that the length between these elements, corresponding to the tank inlet and outlet, is of importance having regard to the flow patterns created in the tank by the suction at the inlet 34 of the withdrawal conduit, and the agitation in the screened enclosure. In its preferred form, the solution, initially introduced in the tank, to above the level of the withdrawal conduit inlet, is about 4½ oz. of a mixture of 7½ gallons of water which fills the tank to a level above the withdrawal opening. The mixture preferably comprises about 80% chlorinated cyanuric acid and about 20% filler. The proportions may however be varied as found desirable. The chlorinated cyanuric acid acts in solution to release chlorine in sufficient quantities to render and maintain harmless the effluent. With the acid, is customarily combined in a deodorizer, a perfume and a dye.

In operation, after the toilet has been used, the motor button is depressed, actuating the motor 28 during such depression. As previously stated, when the motor 28 is actuated, two things happen simultaneously: the pump supplies, from the tank, flush liquid which effectively flushes the bowl. At the same time the agitator breaks up the effluent solids by agitation and by forcing them in and out of the screened enclosure; and at the same time mixes the effluent with the treating chemical. The result is that the effluent is treated so soon after use of the toilet that: odors do not escape up through the bowl; that solid effluent is rapidly and finely broken up for effective treatment by the chemical; and that there is as a result of such treatment, brought up at the flush outlet, flush liquid which is odorless and of not unpleasant appearance.

The parts of the toilet unit which are or might be contacted by the effluent must be constructed with materials which will not be reactive with or corroded by the effluent. I have found it suitable to make the motor shaft, housing, switch and base plate members of stainless steel, pump impellers of "Buna N" rubber (a product of E. I. du Pont de Nemours) and the major remaining parts are preferably made of acrylonitrile butadiene styrene and a polycarbonate form of the above sold under the trademarks "Cycolac" and "Cycalloy" respectively by Marbon Chemical, a division of Borg-Warner Corporation. The plastic members are preferably attached to each other by a mixture of Cycolac resin and methyl ethyl ketone as an adhesive. The above effluent-resistant materials are by example only and other effluent-resistant materials may be used, and the invention is only intended to be limited by the criteria that the materials used must be reasonably effluent-resistant and by the scope of the intended claims.

I claim:
1. A toilet unit comprising:
    a toilet bowl;
    a screened enclosure arranged to be located at a lower level than said toilet bowl;
    a connection to receive, within said screened enclosure, the effluent from said toilet bowl;
    a tank surrounding said screened enclosure;
    a hollow withdrawal conduit extending into the lower portion of said tank, said conduit having an open lower end;
    a pump having its inlet connected to receive the material from the upper end of said withdrawal conduit and having its outlet connected to a flushing outlet in said bowl;
    means for agitating the materials in said screened enclosure;
    means for ensuring that only effluent which has passed through the screen apertures passes into the tank.

2. A toilet unit as claimed in claim 1 wherein said tank is filled above the level of its connection to said toilet bowl with solution for chemically treating said toilet effluent.

3. A toilet unit as claimed in claim 1 wherein the connection from said pump outlet to said flushing outlet includes a valve controllable to divert flow from said pump outlet from said flushing outlet to an alternate outlet, and wherein the alternate outlet is connectible to a conduit extending exteriorly of said unit.

4. A toilet unit as claimed in claim 1 wherein said screened enclosure forms a surface of revolution and said agitating means comprises a rotary shaft driven by said motor, coaxial with said surface of revolution,
    blades on said shaft designed and constructed to cause effluent travel in a direction having an axial component.

5. A toilet unit, as claimed in claim 4 wherein said blades are designed and arranged so that adjacent blades on said shaft propel effluent with opposite axial components.

6. A toilet unit as claimed in claim 1 wherein said screened enclosure is located adjacent one side wall of said tank.

7. A toilet unit as claimed in claim 6 wherein said open lower end of said withdrawal conduit is horizontally displaced over half the major horizontal dimension of the tank from the said screened enclosure.

8. A toilet unit, as claimed in claim 1 wherein said pump and agitating means are connected to a common power source so that said pump and agitating means are simultaneously on, or simultaneously off.

9. A toilet unit, as claimed in claim 4 wherein the shaft of said motor extends from each end thereof, and said motor pump and blade shaft are so arranged that one shaft extension is directly connected to said pump and the other shaft is directly connected to said blade shaft.

References Cited
UNITED STATES PATENTS

| | | | |
|---|---|---|---|
| 3,094,707 | 6/1963 | Fleming | 4—77 |
| 3,289,214 | 12/1966 | Corliss | 4—115 |
| 3,342,341 | 9/1967 | Lee | 4—78 XR |
| 3,343,178 | 9/1967 | Palmer | 4—115 |
| 3,356,221 | 12/1967 | Katona et al. | 4—78 XR |

LAVERNE D. GEIGER, Primary Examiner

H. K. ARTIS, Assistant Examiner

U.S. Cl. X.R.

4—115